United States Patent Office 3,585,157
Patented June 15, 1971

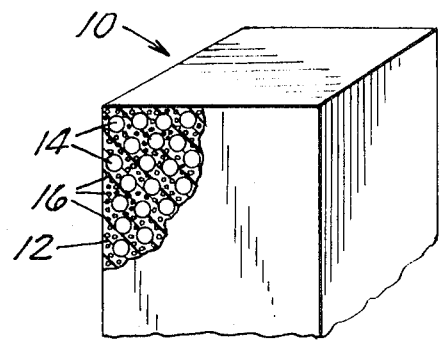

3,585,157
MULTIPHASED SYNTHETIC FOAMS
Warren R. Beck, Mahtomedi, Minn., assignor to Minnesota Mining and Manufacturing Company, St. Paul, Minn.
Filed July 18, 1967, Ser. No. 654,100
Int. Cl. C08g 22/44
U.S. Cl. 260—2.5                                              8 Claims

ABSTRACT OF THE DISCLOSURE

Strong lightweight synthetic foam containing a mixture of macrocells such as polystyrene bubbles and microcells such as glass microbubbles, the addition of the microcells providing enhanced foams as compared to those prepared from only the macrocells, the cells being homogeneously distributed through an organic polymer, for example a thermosetting polymer such as an epoxy, polyurethane, or polyester, the mixture providing an optimized combination of very low density and high strength.

---

This invention relates to low density relatively high strength synthetic foam materials. More particularly, the invention relates to syntactic foams formed from a resin matrix containing two separate void-providing fillers.

Plastic foams have been employed widely in such applications as filler materials for forming lightweight articles. Difficulty has been encountered, however, in forming articles which are both low in density and high in strength. It has generally been necessary to sacrifice low density in order to provide strength, or vice versa, at least in articles or fillers which could be formed at a low cost.

The literature and art of making chemical foams is extensive and highly developed. Yet, none of the methods for generating chemical foams is adaptable to be easily handled by the layman, contractor, or even in many factories, to yield a foam of consistently uniform density throughout. Careful control of forming conditions, time and temperature, is always necessary, and, even when undertaken, does not provide a fully satisfactory solution. It is generally necessary to foam the plastic within a confined chamber to prevent too much expansion, and the pressure generated often requires elaborate, strong, confining structures. Such chemical foams are generally of low strength and have densities below about 0.2. Throughout this specification, all density values are in grams per cubic centimeter (g./cc.).

Syntactic foams, i.e. foams formed by incorporating a void containing filler in a plastic resin, have also recently been made for deep submergence use in submarines and the like. Syntactic foams, however, have been thus far limited to densities above 0.4 and usually between 0.6 and 0.7, when the filler used is tiny glass microbubbles. When a filler containing larger voids is used, for example, polystyrene foam pellets, the density is lowered, but at a great sacrifice in strength. If free voids are added to microbubble containing syntactic foams, it has been found extremely difficult to control the uniformity of density in articles produced in the 0.2 to 0.5 density range.

This invention overcomes the problems of density and uniformity control, while at the same time providing stronger foams at low densities (in the range of 0.3–0.5 grams per cubic centimeter) than previously attainable in a stable foam. Materials within the scope of this invention consist of three basic phases: (1) A polymeric binder to firmly hold the composite together and contribute to the desirable properties of the structure, (2) Small, preformed low density microcells having an average diameter of about 40 microns, but not less than 10 or over 100 microns average, with a density of less than 0.5 (preferably lower than 0.3) and (3) Larger, preformed low density macrocells having an average diameter at least 10 times, but not over 100 times the average diameter of the smaller cells (but 3 mm. maximum average) and a density of less than 0.5 (preferably less than 0.2). The present invention answers the need for strong, low density materials for use as appendage fillers for submarine rudders and the like, boat hulls, light-weight fillers for aerospace applications, etc. This invention makes it possible to attain a specific predetermined density of foam at any specified value in the above range with much greater accuracy than heretofore possible.

The invention is further illustrated in the accompanying drawing, which is a perspective view of a casting showing an end broken-away with the fillers greatly magnified for purposes of illustration.

Many polymers have been found suitable for use as binders. For example, in deep submergence work epoxy resins have been found to provide the highest strength and greatest durability. Therefore epoxy resins would most likely be used for submarines or submergent structures. For the construction of boat hulls or water skis, however, polyester resins are preferred because they have been proven extensively as superior, low cost resins for use in fiber glass reinforced structures continually exposed to water. For general use where continued exposure to water is not expected, the above resins may be used, but polyurethane, polypropylene, vinyl polystyrene, phenolic or other resins are suitable. Normally the binder is a rigid resin. However, if both the microcells and macrocells are of adequate strength, the binder may be of a flexible variety. The preferred resins are polymers which are liquid and solvent-free during mixing and which can subsequently be hardened. Preferred are systems such as polyurethanes, epoxies, and polyesters, which are available as two part liquid systems which, when mixed together, harden at room temperature to form a tough crosslinked polymer. Also useful are thermoplastic resins which can be liquefied by heating, mixed with the fillers, and then again hardened by cooling to room temperature. A minor amount of free voids can be present in the polymer phase, but it is preferred to keep such voids to a minimum, no more than 10% and preferably under 5% by volume of the total mixture.

The small, preformed low density cell phase (sometimes called microbubbles or microballoons) are preferably formed from high strength glass such as used in commercial plate glass, for example those marketed under the designations B–30A, B–40B, B–35D, B–22A, etc. (3M Company), made according to Beck et al. U.S. Pat. 3,365,315, issued Jan. 23, 1968. Less desirable, from strength considerations, though acceptable in some applications, are alkali silicate glass microballoons such as described in the Veatch et al. Pat. No. 2,978,340, issued Apr. 4, 1961. The microcells have an average diameter around 40 or 50 microns, but can be as low as 20 or less or as high as about 100 microns. The average true particle density, as measured by air comparison pycnometer, is less than 0.5. The different grades of microcells have different average densities, most of them being above 0.2 and below 0.4. For best strength retention a coupling agent either on the glass microcells, or added to the resin, is desirable. Volan, a methacrylate-chromic chloride complex, and gamma aminopropyltrialkoxysilane have been found to work well.

The third, or macrocell, Phase 3 above, in this present invention, is a "rigid void" which is preferably spherical, of lowest possible density consistent with adequate strength, and has an average particle diameter somewhere between 10 and 100 times the average particle diameter of the microcells present, but not over 3 mm. Thus, if the microcells are 40 microns in diameter, the macrocells should be at least 400 microns but not over 3 mm. average diameter. It has been found that macrocells greater than about 3 mm. result in lower uniaxial compressive strength. These dimension relationships have been found to provide both strength and low density in the foams. The density of the macrocell should be the lowest possible while retaining adequate strength. The minimum useful strength is enough to permit handling, mixing in the resin, and casting, spraying or forming of the product. Preferably a rigid void is introduced. Foamed polystyrene, expanded to densities of 0.1 or even less, has been found satisfactory. Glass or ceramic macrocells having an average density below about 0.5 can also be used. An important property of the macrocells is that they have a density below 0.5.

It is theorized that the microcells act to keep the macrocells spaced apart from each other in the system. Thus the effective wall thickness of the macrocells is greatly increased as compared to a system in which the macrocells are in direct contact with each other. Thus, as seen in the drawing, article 10 is formed from a polymer phase 12, a macrocell phase 14, and a microcell phase 16. The relationship of the cells shown in the drawing is believed to exist in systems which are homogeneously mixed together.

Some variations in the percentages of the various phases used in the system is permissible, depending on the density and strength requirements of a particular application. In general, the polymer binder, hereinafter referred to as "Phase 1," should range between 10 and 50%, and preferably 15 to 40%, by volume, of the system. The microcells should constitute between 10 and 70%, and preferably 20 to 55%, by volume of the system. The macrocells may range between 5 and 70%, and preferably 10 to 50%, by volume, of the system.

The invention will be further illustrated by the following non-limiting examples. Parts are by weight unless otherwise indicated.

EXAMPLE I

A mix was made by stirring together with a spatula the three phases of a composite in the following proportions:

|  | Volume, percent | Weight, percent |
| --- | --- | --- |
| Phase: | | |
| 1 (binder) | 36 | 77.3 |
| 2 (microcell) | 24 | 10.3 |
| 3 (macrocell) | 40 | 12.4 | wherein the three phases were as follows:

Phase 1: A polyurethane resin prepared by mixing together equal parts by weight of A (220 parts polypropylene oxide triol of MW 440, 180 parts polypropylene oxide triol of MW 740, 0.8 part calcium octoate, and 0.2 part phenyl mercuric acetate, catalyst) and B (260 parts toluene diisocyanate, 140 parts polypropylene oxide triol of MW 740).

Phase 2 (microcell): 3M glass bubbles designated as Type B–22A, having a true particle density of 0.201 and an average particle diameter of about 38 microns. These microcells were surface treated with the aforementioned Volan coupling agent.

Phase 3 (macrocell): Expanded polystyrene sphere particles having bulk density of .084 and true density of 0.144 and a particle size of 18 to 30 mesh (590 to 1000 microns) or an average diameter of about 800 microns.

After mixing to homogeneity, the batch was poured into a mold to cure. A tough lightweight casting was formed within about 20 minutes of casting. After several days curing, the density was determined as 0.36 and its uniaxial compressive strength was 1200 p.s.i. (a foam made without Phase 2 having about this same density had only 500 p.s.i. uniaxial crush strength, and foam made without Phase 3 had a minimum density of .55).

EXAMPLE II

The same ingredients as used in Example I were used, but in the following proportions:

|  | Volume, percent | Weight, percent |
| --- | --- | --- |
| Phase: | | |
| 1 | 30 | 72.5 |
| 2 | 20 | 10 |
| 3 | 50 | 17.5 |

The mix was trowelled and packed tightly into a mold to cure. Its density was 0.29 and its uniaxial compressive strength 800 p.s.i., compared to less than 100 p.s.i. for the same density foam without Phase 2 present.

EXAMPLE III

The same ingredients as above were used for Phases 1 and 2, but Phase 3 was a hollow glass sphere of 14 to 30 mesh diameter (about 800$\mu$ ave.) and density of 0.4 (Kanamite, grade 230). Proportions were:

|  | Volume, percent | Weight, percent |
| --- | --- | --- |
| Phase: | | |
| 1 | 36 | 48.2 |
| 2 | 24 | 13.1 |
| 3 | 40 | 38.7 |

The density of this composite was 0.485 and the compressive strength 2000 p.s.i.

EXAMPLE IV

A mix was made by stirring together the ingredients of Phase 1 of a composite, Phase 2 was added and mixed in with a spatula, then Phase 3 was added and mixed in by spatula in the following proportions:

|  | Volume, percent | Weight, percent |
| --- | --- | --- |
| Phase: | | |
| 1 (binder) | 30.0 | 67.2 |
| 2 (microcell) | 40.0 | 28.7 |
| 3 (macrocell) | 30.0 | 3.1 |

The three phases were as follows:

Phase 1.—A polyepoxy resin was prepared by mixing together equal parts by weight of a liquid diglycidyl ether of bisphenol A of epoxy equivalent weight 190–200 and an amine terminated polyamide of dimerized linseed fatty acids and diethylene triamine of amine value 330–360.

Phase 2.—3M glass bubbles designated as Type B–35D having a true particle density of 0.346 and an average particle diameter of 40 microns. These microcells were surface treated with Volan coupling agent.

Phase 3.—Expanded polystyrene sphere particles having a bulk density of 0.049 and a true density of 0.076 and a particle size of 10–18 mesh (1000–1680 microns) or an average diameter of 1340 microns.

After mixing to homogeneity, the batch was trowelled into a mold to cure at room temperature. After the cure was completed the density was determined as 0.394 and the uniaxial compressive strength was 2100 p.s.i.

EXAMPLE V

The same ingredients as used in Example IV were used, but in the following proportions:

| | Vol., percent | Wt., percent |
|---|---|---|
| Phase: | | |
| 1 | 30 | 59.1 |
| 2 | 65 | 40.4 |
| 3 | 5 | 0.44 |

The mix blended as in Example IV, trowelled into a mold, and cured at room temperature. The density for this composite was 0.472, and the uniaxial compressive strength was 3900 p.s.i.

EXAMPLE VI

A mix was made by melting the ingredients of Phase 1 and reducing the temperature to 150° F., adding Phase 2 and hand blending, and then adding Phase 3 and hand blending. The proportions were:

| | Vol., percent | Wt., percent |
|---|---|---|
| Phase: | | |
| 1 (binder) | 33.3 | 72.9 |
| 2 (microcell) | 59.7 | 26.0 |
| 3 (macrocell) | 7.0 | 1.1 |

The three phases were as follows:

Phase 1.—A thermoplastic resin copolymer of ethylene and vinyl acetate with a melt index of 400 and an inherent viscosity of 0.59, containing 28% by weight of vinyl acetate, was melted with an equal weight of ASTM 155/158 fully refined paraffin wax and the solution cooled to 150° F.

Phase 2.—3M glass bubbles designated as Type B–22A having a true particle density of 0.201 and an average particle diameter of 40 microns. These microcells were surface treated with Volan coupling agent.

Phase 3.—Expanded polystyrene sphere particles having a bulk density of 0.049 and a particle size of 10–18 mesh (1000–1680 microns) or an average diameter of 1340 microns.

After blending to homogeneity, the batch was rapidly trowelled into a polyethylene form to harden at room temperature. The final density was determined as 0.43 and the uniaxial compressive strength was 450 p.s.i.

What is claimed is:

1. A stable, workable, syntactic foam of closely controlled predetermined density between about 0.2 to 0.5 grams per cubic centimeter, comprising the three phases, (1) a binder phase, (2) a microcell phase, and (3) a macrocell phase, in the following proportions:

| | Percent by volume |
|---|---|
| Binder (Phase 1) | 10–50 |
| Microcells (Phase 2) | 10–70 |
| Macrocells (Phase 3) | 5–70 | wherein the binder is a rigid, high molecular weight, synthetic organic polymeric resin, the microcells of said microcell phase are hollow spheres having an average diameter greater than 10 but less than 100 microns and a density less than 0.5 g./cc., the macrocells of said macrocell phase are spheres or spheroids having an average diameter at least 10 but less than 100 times the said average diameter of the said microcells and having a density less than 0.5 g./cc., said microcells being uniformly distributed among said macrocells, said macrocells being spaced apart from each other in said syntactic foam, said proportions being selected such that the free voids in said syntactic foam are less than 10 volume percent of said syntactic foam.

2. A strong lightweight synthetic rigid syntactic foam article having a closely controlled, predetermined density between about 0.2 to 0.5 gram per cubic centimeter, comprising 10 to 50% by volume of a binder phase, said binder phase comprising a rigid, high molecular weight, synthetic organic polymeric resin binder, said resin selected from the group consisting of epoxy, polyester, polyurethane, polypropylene, vinyl, polystyrene, and phenolic resins.

10 to 70% by volume of a phase of hollow glass microcells having a density less than 0.5 gram per cubic centimeter and an average diameter of at least 10 but less than 100 microns, and 5 to 70% by volume of a phase of spheroidal macrocells having an average diameter which is at least 10 but less than 100 times the said average diameter of the said microcells, the diameters of said macrocells being in any event less than 3 mm., said macrocell phase having a density less than 0.5 gram per cubic centimeter, said microcells being uniformly distributed among said macrocells, said macrocells being spaced apart from each other in said syntactic foam article.

3. A foam according to claim 1 which is substantially free of volatile organic solvents.

4. An article according to claim 2 wherein the free voids in said article amount to less than 10 volume percent, wherein said average diameter of said microcells is less than about 50 microns, and wherein the average diameter of said macrocells is at least 400 microns.

5. An article according to claim 2 wherein said macrocells comprise a polymer, completely enveloping at least one air space.

6. An article according to claim 5 wherein said macrocells are spherical particles comprising expanded polystyrene.

7. An article according to claim 2 wherein said article comprises 15 to 40% by volume of said binder phase, 20 to 55% by volume of said phase of hollow glass microcells, and 10 to 50% by volume of said phase of spheroidal macrocells, said article having a uniaxial compressive strength of at least 2000 p.s.i.

8. A hardenable, pourable syntactic foam-forming composition comprising three intimately admixed phases, (1) a binder phase, (2) a microcell phase, and (3) a macrocell phase in the following proportions:

| | Percent by volume |
|---|---|
| Binder (Phase 1) | 10–50 |
| Microcells (Phase 2) | 10–70 |
| Macrocells (Phase 3) | 5–70 | wherein the binder is a liquid, high molecular weight, synthetic organic polymeric resin which is hardenable to a rigid solid, the microcells of said microcell phase are hollow spheres having an average diameter greater than 10 but less than 100 microns and a density less than 0.5 g./cc., the macrocells of said macrocell phase are spheres or spheroids having an average diameter at least 10 but less than 100 times the average diameter of the said microcells and having a density less than 0.5 g./cc., said microcells being uniformly distributed among said macrocells, said macrocells being spaced apart from each other in said syntactic foam-forming composition, said proportions being selected such that the free voids is said composition are less than 10 volume percent of said composition.

(References on following page)

References Cited

UNITED STATES PATENTS

| | | | |
|---|---|---|---|
| 2,806,509 | 9/1957 | Bozzacco et al. | 260—2.5 |
| 2,978,340 | 4/1961 | Veatch et al. | 260—2.5 |
| 3,238,156 | 3/1966 | Kohrn | 260—2.5 |
| 3,300,421 | 1/1967 | Merriman et al. | 260—2.5 |

FOREIGN PATENTS

| | | | |
|---|---|---|---|
| 571,519 | 3/1959 | Canada | 260—2.5 |
| 975,334 | 11/1964 | Great Britain | 260—2.5 |

OTHER REFERENCES

Bulletin Number J-868 of the Bakelite Department of Union Carbide International Company, "Resins for Reinforced Plastics," 12 pages.

Handbook of Chemistry & Physics, 38th edition, pp. 3112–3113 (1956).

Industrial Equipment News, volume 34, Number 9, p. 12 (1966).

Gross, Undersea Technology, March 1966, pp. 23–27.

DONALD E. CZAJA, Primary Examiner

M. J. WELSH, Assistant Examiner

U.S. Cl. X.R.

260—2